United States Patent [19]

Greek, Jr. et al.

[11] 4,357,680
[45] Nov. 2, 1982

[54] SELECTIVE FORMATTING OF BLOCKS OF TEXT CODES IN A MEMORY OF A WORD PROCESSING SYSTEM

[75] Inventors: John C. Greek, Jr.; Charles N. Sprott, both of Austin, Tex.

[73] Assignee: International Business Machines Corporation, Armonk, N.Y.

[21] Appl. No.: 141,744

[22] Filed: Apr. 18, 1980

Related U.S. Application Data

[63] Continuation of Ser. No. 883,444, Mar. 6, 1978, abandoned.

[51] Int. Cl.³ .............................................. G06F 13/00
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 3,772,655 | 11/1973 | Bluethman et al. | 364/900 |
| 3,915,278 | 10/1975 | Spence et al. | 364/900 |
| 3,987,415 | 10/1976 | Boyd | 364/900 |
| 3,991,405 | 11/1976 | Boyd et al. | 364/900 |
| 3,998,311 | 12/1976 | Greek, Jr. et al. | 364/900 |
| 4,244,031 | 1/1981 | Izushima et al. | 364/900 |

*Primary Examiner*—Raulfe B. Zache
*Attorney, Agent, or Firm*—John W. Henderson, Jr.

[57] ABSTRACT

A system for automatically adjusting text codes and control codes stored in a memory into text blocks having variable formatting parameters and variable line counts. The detection of a code signal causes the system to enter a non-playout adjust mode. The operator is then prompted to enter a line count for the text block to be formatted. After the line count is entered, the system proceeds to adjust in memory the number of lines of text equal to the line count to the predetermined formatting parameters with no external output of the text. An interrupt of the adjust mode occurs upon the detection of any one of a number of predefined special conditions including the end of text, mode-measure codes in memory, special codes (e.g. stop, edit, error, page end), hyphenation requests, forced line overflow, or upon completion of the text block line count. The system presents to the operator visual indicators upon the occurrence of an interrupt sufficient to define the cause of the interrupt and the location in text where the special condition occurred. During the interrupt, the operator may enter information into the system or play out codes from memory, and then enter a code signal that causes the system to continue in the non-playout adjust mode.

11 Claims, 11 Drawing Figures

SELECTIVE FORMATTING OF BLOCKS OF TEXT CODES IN A MEMORY OF A WORD PROCESSING SYSTEM

This is a continuation of application Ser. No. 883,444 filed Mar. 6, 1978 now abandoned.

DESCRIPTION

Background of the Invention

1. Field of the Invention

This invention relates generally to automatic text formatting systems and more particularly to a system for automatically formatting text code sequences in a memory into blocks of text code sequences before output from the memory to an output device.

2. Description of the Prior Art

It is known in the prior art to adjust text codes stored in a memory in accordance with preset format parameters including tab codes and justified right margins without the necessity for printing out the text being formatted. For example, in U.S. Pat. No. 3,991,405 issued Nov. 9, 1976 to William Weller Boyd, et al, and entitled "Margin Adjusting of Textual Codes in a Memory" there is described such a technique. In an adjustment operation, control logic is provided for comparing the accumulated count of escapement codes in the memory with a predetermined right margin count minus the "hot zone" width. Carrier return codes occurring before a compare is reached are replaced with delete or space codes. In the "hot zone" a carrier return code is inserted in the position of the last proper line terminating condition existing therein. If no such condition exists in the "hot zone" the control logic enables an output device to print out the entire word that spans the "hot zone". Included in this printout is the line number on which the non-terminating condition occurred as well as an indication to the operator of whether or not the word is the last word of a paragraph.

When a tab code is sensed during this adjustment procedure, a logic is provided for calculating the amount of space required for eventual printer execution of the tab code by counting the number of character positions between appropriate tab codes in the electronic tab rack. The number of character codes and control codes to be included in the line including the tab code is, thus, diminished in accordance with the amount of space that will be required for execution of the tab code by the printer or other output device.

Prior art systems such as that described above are limited in their capability to handle complex text formatting jobs such as, for example, those in the composing industry where text on a single page may include justified blocks of text of different line lengths commonly known as "run arounds" to compensate for the placement of pictures or other non-text matter on the page. Further, the prior art text formatting systems did not allow the operator to scan the memory to a designated text line and to begin formatting text following the scanned-to line to different format codes than the preceding text was formatted to. Finally, the prior art systems did not provide for interrupting the adjusting operation for a variety of special codes which may be included in the text in the memory, for supplying the operator with sufficient information to enable a determination to be made of the cause of the interrupt, for permitting the operator to enter information into the system while maintaining correct line endings without requiring a second scan, and then for returning to the adjusting mode.

SUMMARY OF THE INVENTION

An interactive text formatting system is provided wherein text character codes and format codes stored in a memory are arranged into text blocks each of which may have a different mode and line measure without presenting a complete output of the adjusted codes. The system is placed into a non-playout adjust mode by the depression of a key button on the keyboard. The operator is then requested by the system to enter a range for the number of lines to be adjusted in accordance with the existing formatting parameters. Upon entry of the range number, the system automatically adjusts the stored text to the formatting parameters and interrupts only for line overflows or special codes which may be stored with the text codes in the memory. Upon the occurrence of an interrupt condition, the system presents to the operator sufficient information to identify the type of interrupt and its location in the text, including the line number in the text where the interrupt occurred. The operator has the option to enter or delete additional text, format parameters, or control codes into or from the memory, to playout characters from memory, and/or to enter a control signal that causes the system to continue the adjust operation. When the number of adjusted lines equals the range input line count, the adjust operation will terminate with a playout of the last line adjusted. The operator then has the option of starting a new adjust operation from the point in the text where the previous adjust operation terminated in order to reformat additional lines of text to new parameters that the operator may choose to enter. Text character codes and format codes may be added to memory or deleted from memory within the text block by scanning the memory to an interrupt code in the non-playout adjust mode and deleting existing codes and/or entering the additional codes desired. The operator may choose to playout codes from memory while system is interrupted.

DETAILED DESCRIPTION OF THE PREFERRED EMBODIMENT

Figure 1:
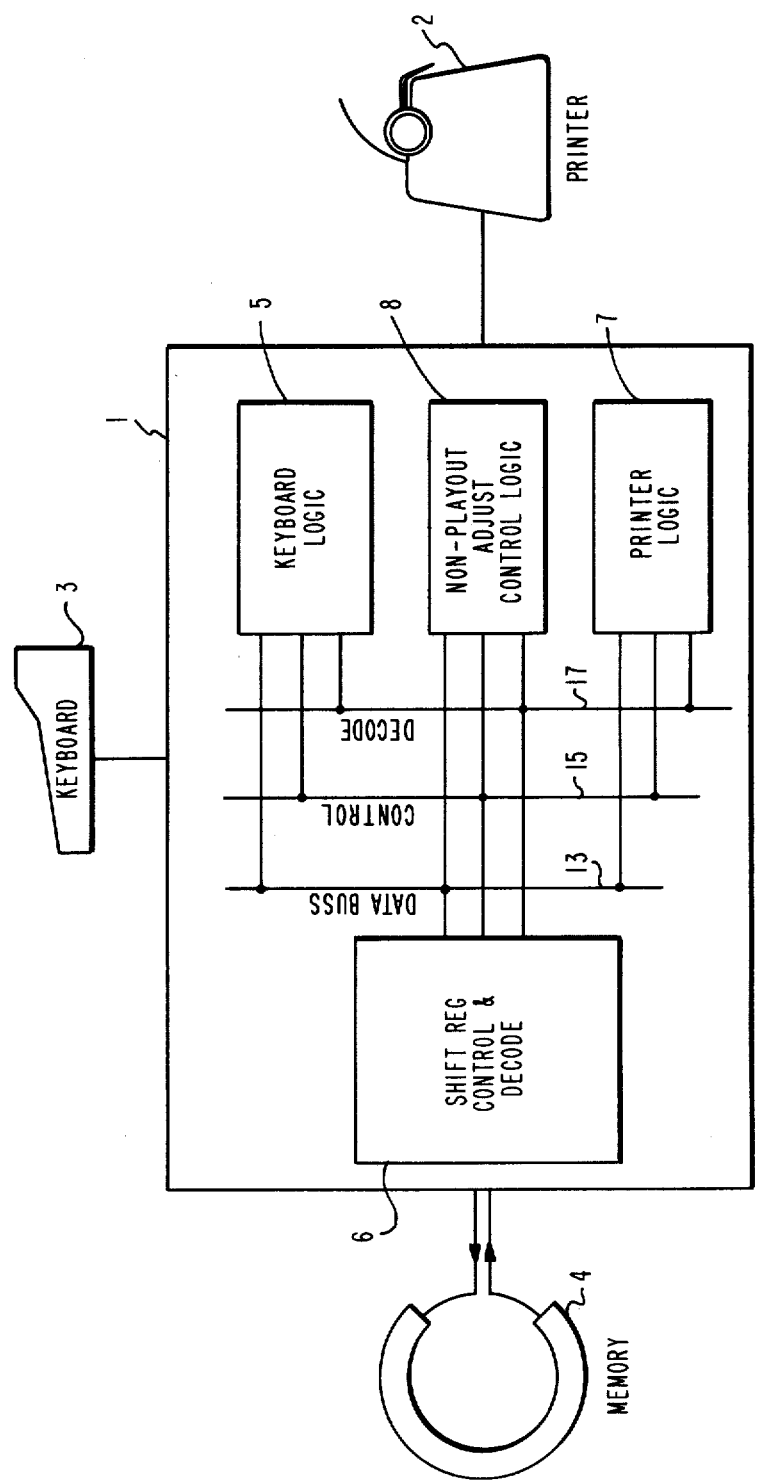
FIG. 1 is a pictorial representation of a word processing system.

Referring to FIG. 1, there is shown a word processing system which includes a printer 2, a keyboard 3, and a recirculating memory 4 in communication with systems logic 1 through data bus 13, control bus 15, and decode bus 17. The systems control logic includes keyboard logic 5, printer logic 7, shift register control and decode logic 6 and non-playout adjust control logic 8. The recirculating memory 4 may be of the well known recirculating dynamic shift register memory type which includes shift register control and decode 6, for example, as disclosed in U.S. Pat. No. 3,675,216 issued July 4, 1972 to Randell L. James.

Figure 2:
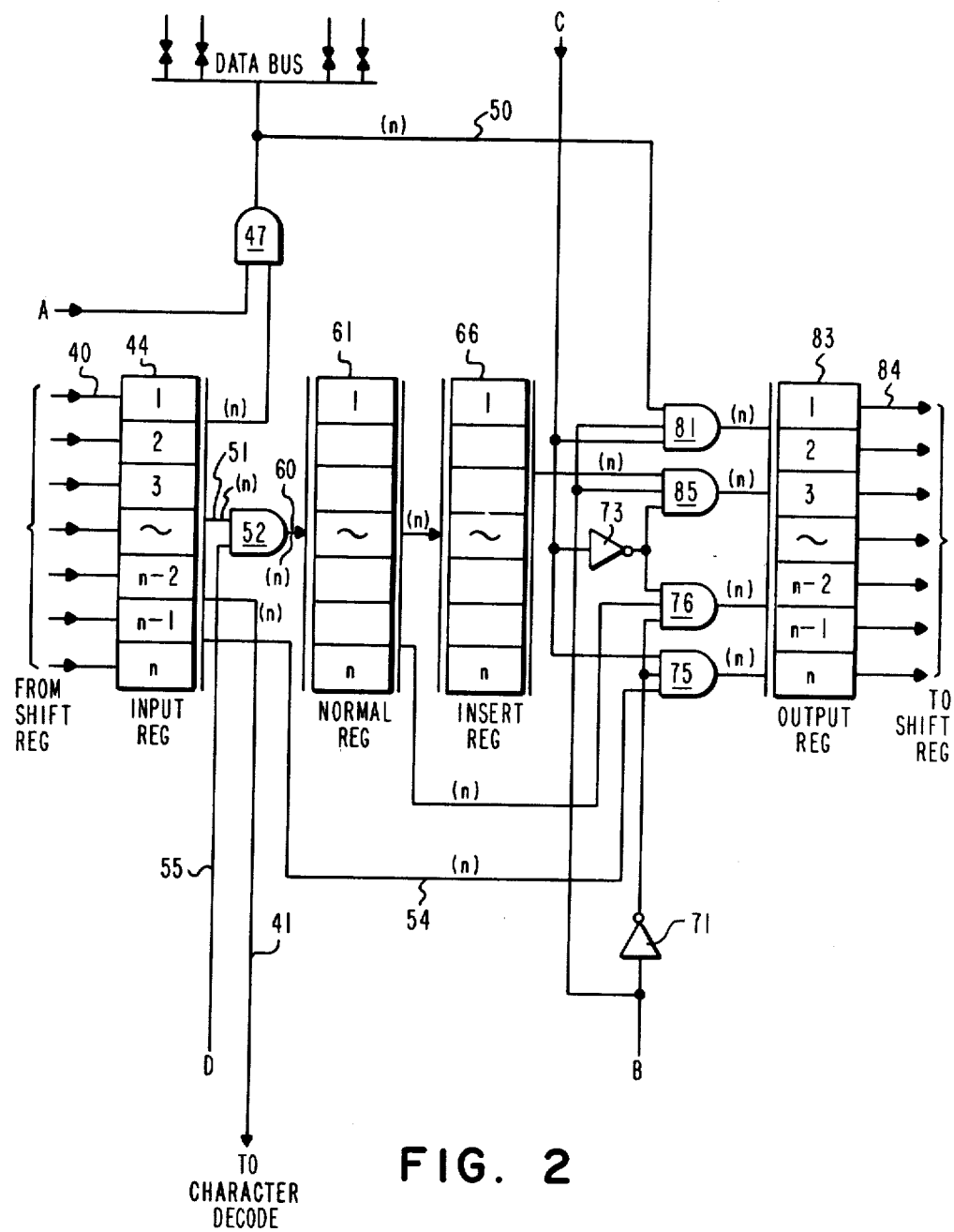
FIG. 2 is a detailed representation of shift register control and decode of FIG. 1.

Referring now to FIG. 2 a more detailed drawing of the shift register control and decode 6 is shown. The circuitry of FIG. 2 is essentially the same as FIG. 4 of the James patent and is described in detail therein at column 4, lines 1-75 and column 5, lines 1-17. The control signals A, B, C, and D control the flow of data from the shift register memory 4 through the shift register control 6 and back into the shift register memory 4. The control signals A, B, C and D also control the path taken by data being accessed from the shift register memory, inserted into the shift register memory, or deleted from the shift register memory. The detailed manipulation of the control signals to perform the various operations is given in the above referenced James patent. Briefly, data passes from the shift register 4 through the signal lines 40 into the input register 44. From the input register 44 the data may be passed to the data bus 13 by applying a positive control signal A to AND gate 47. During normal operation, signal D is at a logical 1 level on line 55 to gate the contents of input register 44 over data line 51 through AND gate 52 and into normal register 61. The contents of normal register 61 are gated through AND gate 76 by a logical zero signal B which is inverted by INVERTER 71 and a logical zero signal C which is inverted by INVERTER 73. The contents of the normal register are passed by the AND 76 into the output register 83 and back into the memory 4 (FIG. 1) over data lines 84.

Data may be inserted into the memory 4 from the data bus 13 by raising the signal lines B and C to a logical 1 level which operates AND gate 81 to pass data from the data bus over data line 50 into the output register 83. The data present in the normal register 61 at this time will be preserved in the insert register 66 and the next character present in the input register 44 will be shifted into the normal register 61. This technique expands the capacity of the shift register memory by one character.

Following the insertion of the character from the data bus 13, signal C is dropped to a logical zero and signal B remains a logical one which, together with the inversion of signal C from INVERTER 73, operates AND gate 85 to pass the contents of the insert register 66 to the output register 83. Data continues to cycle through insert register 66 in this fashion until a character that is to be deleted from the memory is present in the input register 44. Following the next two data shifts, the signal line B is dropped to a logical zero trapping the character to be deleted in the insert register 66. The signal line D remains at a logical one, passing data into the normal register from the input register 44 and the logical zero signals on lines B and C are inverted to operate AND gate 76 and pass the data from the normal register 61 into the output register 83. Thus the shift register control is returned to the normal state by eliminating the one-character shift register memory expansion.

Figure 3:
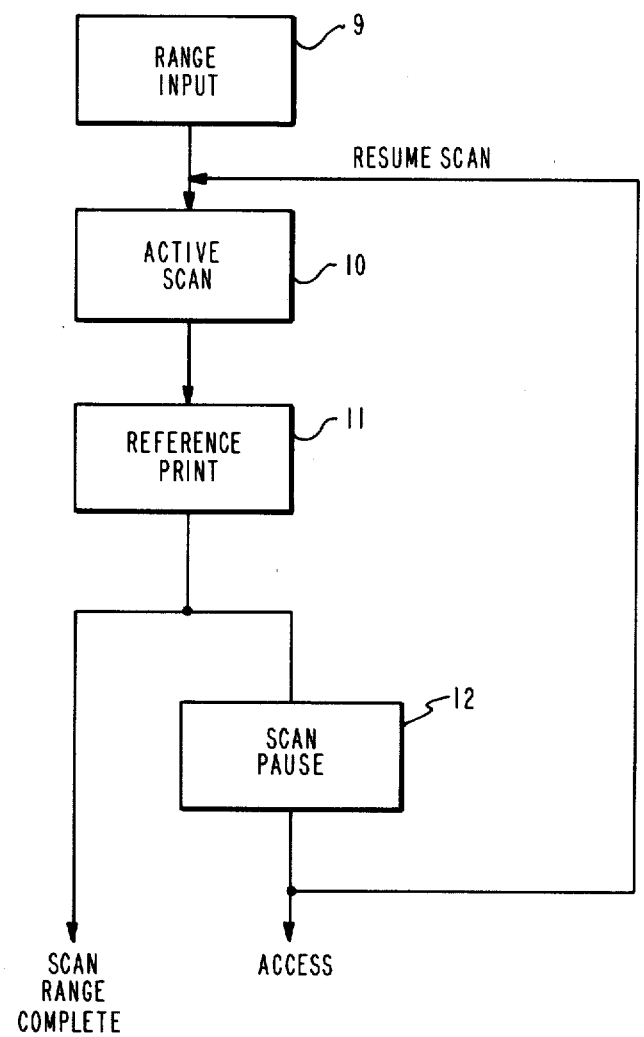
FIG. 3 is a flow diagram depicting the operations performed by the non-playout adjust control logic of FIG. 1.

FIG. 3 shows the logical flow through the interactive non-playout adjust operation of the word processing system. Assuming that the operator wishes to place the system in a non-playout adjust mode, a scan request button is depressed on the keyboard 3 which places a signal on the data bus 13. This signal places the system in the range input mode 9 wherein the operator is requested to enter a number representing the number of lines to be adjusted. Following the entry of the range input number, the system enters the active scan mode 10 wherein the text characters stored in the memory are adjusted in accordance with preestablished formatting parameters including the mode and the measure parameters. The mode parameter is the type of formatting operation, for example justify, flush left, a ragged right, and the measure is the total escapement set for each line of text. While in the active scan mode 10, if the system encounters an interrupt code, line overflow, or determines that the range input number has been satisfied, it will enter a reference print operation 11 wherein a visual output is presented to the operator indicating that an interrupt has occurred, the nature of the interrupt, and the location in text of the interrupt condition. If the interrupt is caused by the satisfaction of the range input number, then the reference print will consist of printing the last line of text that was adjusted and the scan range will be complete. The line will be preceded by a line number and a special symbol indicating the last-line condition. If the interrupt is caused by some other condition, for example a stop code, edit code, error, line overflow, or page end code in the text, the system will enter a scan pause 12 following the reference print. While in the scan pause 12, the operator has the option to enter additional information into the system or to playout text from the memory, and/or to resume the active scan operation.

Referring now to FIG. 1, assume that the shift register memory 4 has been loaded with a sequence of textual codes corresponding to lines and paragraphs of text input from the keyboard 3 or some other suitable input-/output means, for example, a magnetic tape or disc file. Prior to the initiation of a non-playout adjust operation, mode and measure information must be stored into the system. The measure information is stored in a measure register 160 (FIG. 7) which may be a random access memory of the type disclosed in U.S. Pat. No. 3,991,405 issued Nov. 9, 1976 to William Weller Boyd, et al, which includes a separate bit storage position for each character print position on the print line of printer 2. A detailed discussion of the operation of the random access memory measure register is presented in column 6 at lines 36-63 of the Boyd patent. Tab stops may be stored in the measure register by escaping the print carrier of the printer 3 to a desired tab position and activating a tab set switch on the keyboard, which, in turn sets the bit storage location in the random access memory corresponding to the chosen printer location on the keyboard 3. Activation of the tab set key generates a MODEC decode from character decode 56 on line 141. This decode activates one character shift register 316 and operates AND gate 318 to pass the tab code that follows into binary decode 240. The output of the binary decode 240 then sets the proper tab information into the measure register 160. The right margin boundary is stored in the measure register 160 by spacing the print carrier out to the desired right margin point and entering a carrier return. The difference between the left margin and right margin is then used to calculate the total escapement for a printed line of text characters. The mode, measure, and tab stop information is also stored in the memory 4 as a sequence of codes allowing subsequent output formatting of the text without operator action.

RANGE INPUT MODE

Figure 6:
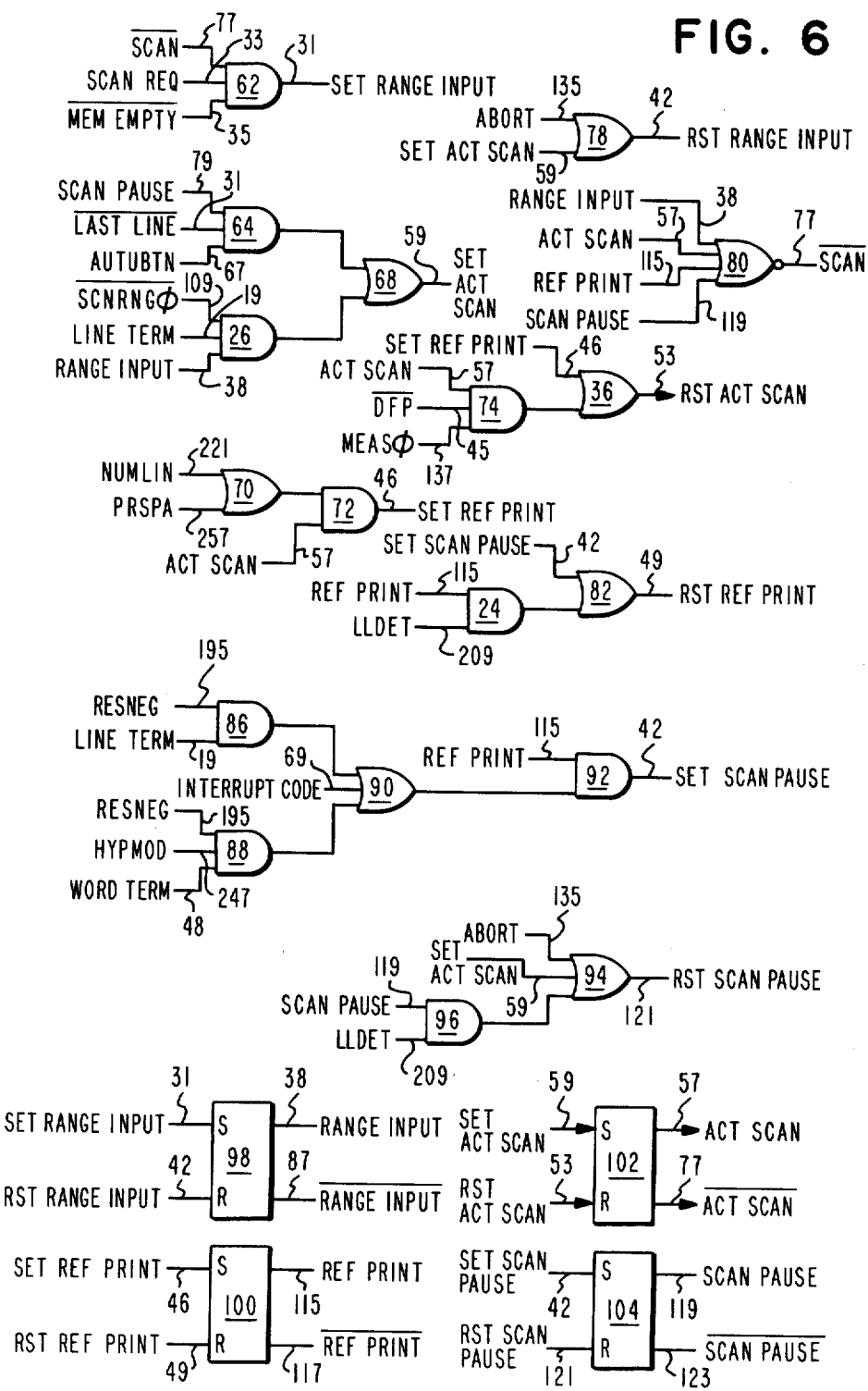
FIG. 6 depicts the logic used to set the different operations of the system shown in FIG. 3.
Figure 7:
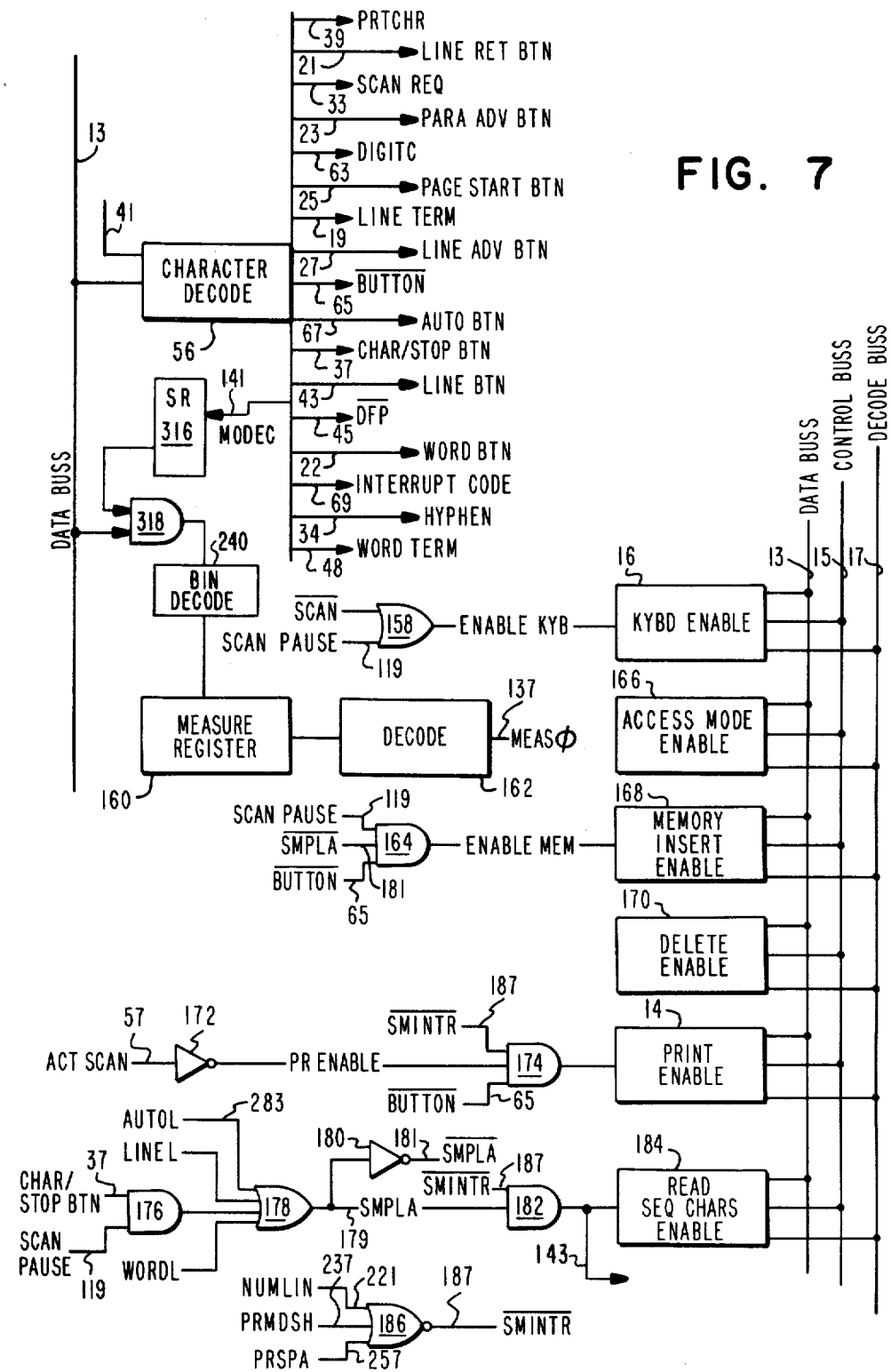
FIGS. 7, 8 and 9 show in detail the non-playout adjust control logic of FIG. 1.

Referring now to FIG. 7, when the operator depresses a scan request key button on the keyboard 3, a signal is generated on the data bus 13 which is decoded by the character decode 56 and presented on the scan request line 33. This scan request signal on line 33 serves as one input to AND gate 62 in FIG. 6 and is gated through on line 31 to set the range input latch 98 by the coincidence of the memory not being empty signal $\overline{\text{MEMEMPTY}}$ on line 35 and the system not already being in the scan mode by $\overline{\text{SCAN}}$ signal on line 77. The $\overline{\text{MEMEMPTY}}$ signal on line 35 which indicates that the memory 4 is not empty is derived from a memory empty detector 258 in FIG. 9 which senses the decode bus 17 to determine when the memory 4 contains no data characters. If the memory 4 contains no data characters, the MEMEMPTY will be logical one and SCAN REQ 33 and $\overline{\text{SCAN}}$ 77 activate AND gate 260 to set latch 262. The output of latch 262 then causes control 702 to select the printer and print the letters E M indicating to the operator the empty memory condition. This signal is inverted by INVERTER 238 to provide the memory not empty signal $\overline{\text{MEMEMPTY}}$. The $\overline{\text{SCAN}}$ signal on line 77 is derived from NOR gate 80 whose inputs are the RANGE INPUT 38, ACTIVE SCAN 57, REFERENCE PRINT 115, and SCAN PAUSE 119 derived from the mode latches in FIG. 6. Since none of these modes have been previously set all inputs to NOR gate 80 will be at logical zero and the $\overline{\text{SCAN}}$ signal on line 77 will be a logical one.

Figure 5:
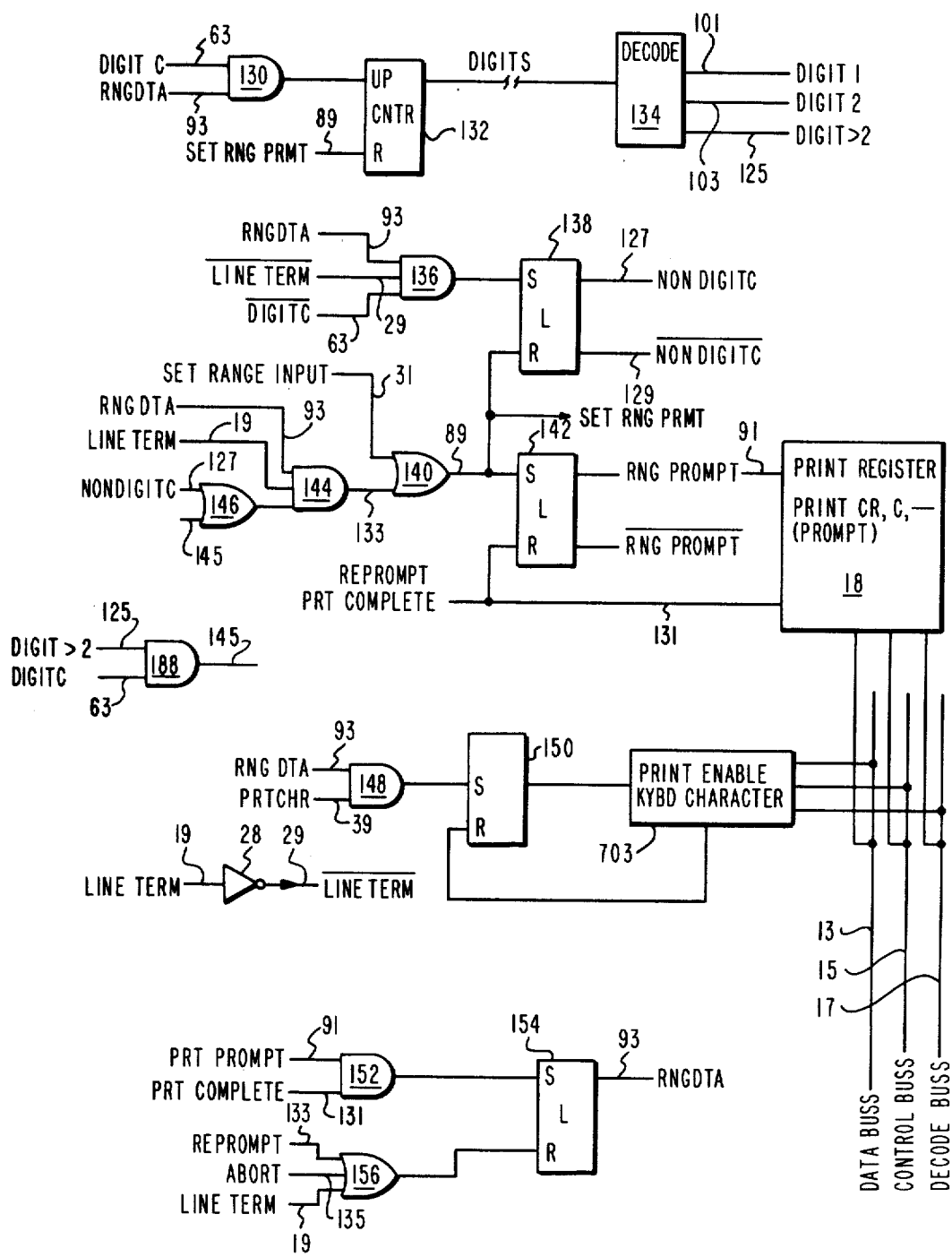

The SET RANGE INPUT signal on line 31 sets the RANGE PROMPT latch 142 in FIG. 5 through OR gate 140 and line 89. The SET RANGE INPUT signal also resets latch 138 and counter 132. The RANGE PROMPT signal on line 91 then causes the print register 18 to place signals on the control bus 15 and data bus 13 to cause the printer 2 (FIG. 1) to execute a carrier return and print a prompt to the operator requesting that a number be entered from the keyboard representing the number of lines of text to be adjusted. In the preferred embodiment the prompt message consists of a carrier return followed by a lower case C and an "em dash". When the print process is complete a signal comes back on line 131 to reset the RANGE PROMPT latch 142. The PRINT COMPLETE signal on line 131 together with the RANGE PROMPT signal on line 91 sets the RANGE DATA latch 154 through AND gate 152 to produce a logical one RNGDTA signal on line 93. The RNGDTA signal on line 93 serves as the gating signal to control the entry of the range number into the system from the keyboard. The system is now ready for the range number to be entered from the keyboard. When a key button is depressed, the signal representing the character from the keyboard is placed on the data bus 13. This signal is decoded by the character decode 56 and the appropriate decode output is set. If the character is a printing character as opposed to a control character, the signal on line 39 becomes a logical one. If the character keyed is also a digit character then the DIGITC signal on line 63 also becomes a logical one. Referring back to FIG. 5, the RNGDTA signal on line 93 gates the DIGITC signal on line 63 through AND gate 130 to cause counter 132 to count up by one. The RANGE DATA signal 93 also gates the PRTCHR signal on line 39 through AND gate 148 to set print enable latch 150 to cause the print enable 703 to print the character that was keyed on the printer 2. The print enable latch 150 is reset by a signal from the printer logic indicating that the character has been printed. The latch 138 has been reset by the SET RANGE INPUT signal on line 31 as previously discussed through OR gate 140 and the $\overline{\text{NONDIGITC}}$ signal on line 129 is at logical 1.

Figure 4:
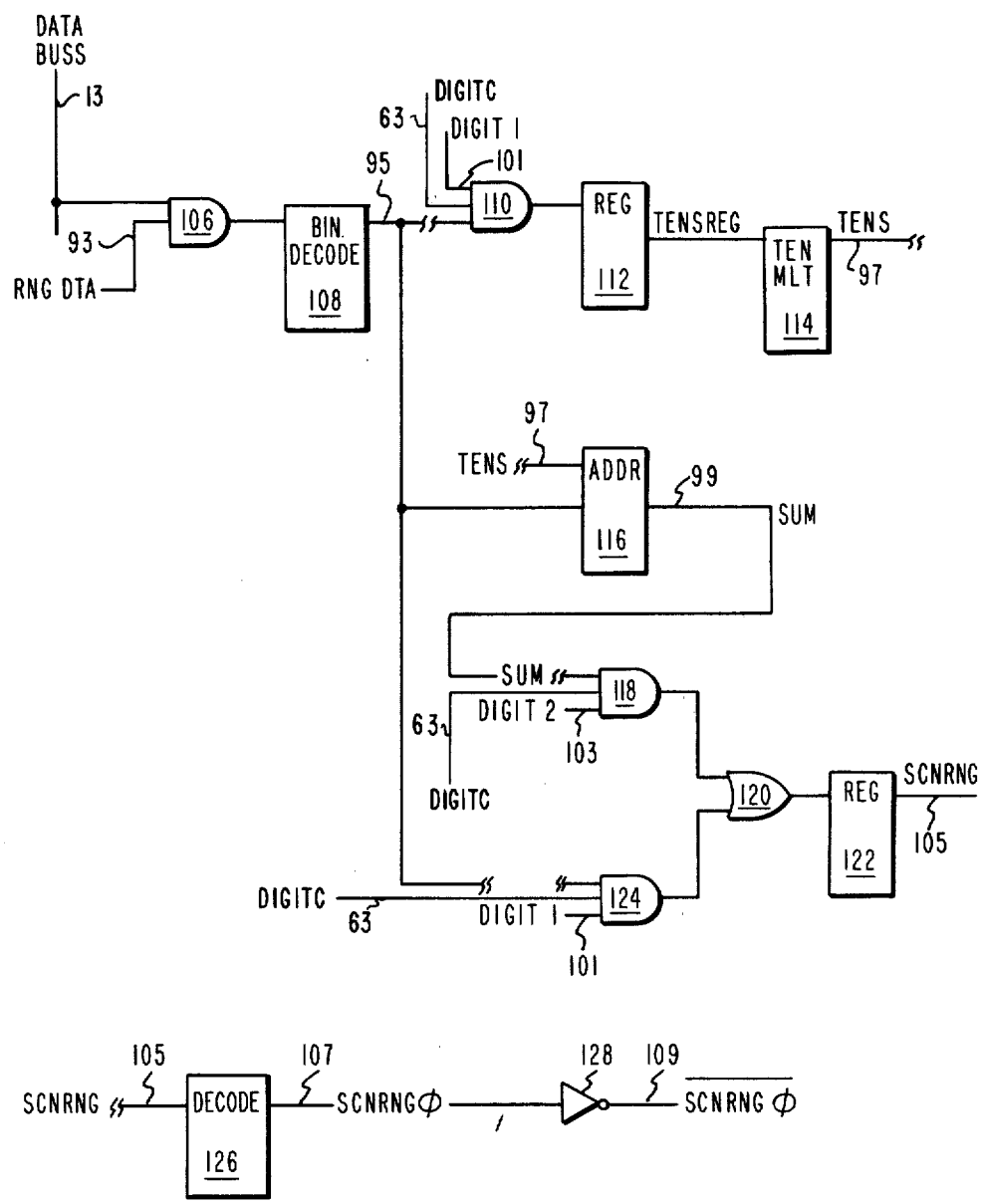
FIGS. 4 and 5 show the logic used to conduct the range input operation of FIG. 3.

Referring to FIG. 4, the RNGDTA signal on line 93 gates the character that was keyed from the data bus 15 through AND gate 106 into binary decoder 108. The output of the counter 132 (FIG. 5) is decoded by decode 134 to set an output indicating the next digit number to be keyed. The counter 132 was previously cleared by the SET RANGE PROMPT signal 89 causing the DIGIT1 line 101 to be true. Referring back to FIG. 4, the DIGIT1 signal combines with the DIGITC signal on line 63 to operate gate 110 and pass the contents of binary decoder 108 into register 112. The contents of the binary decoder 108 are also transferred into adder 116 over signal line 95. The DIGIT1 signal and DIGITC signal control AND gate 124 to pass the contents of binary decoder 108 through AND gate 124 and OR gate 120 into register 122. The output of the register 122 is the scan range indicated by SCNRNG signal on line 105. The SCNRNG signal 105 is decoded by decode 126 to produce a signal on line 107 indicating whether the scan range number input is zero. This signal is inverted by INVERTER 128 to produce a signal on line 109 indicating that the scan range is not zero.

The binary decode of the first character that was transferred into the register 112 is input to tens multiplier 114 which multiplies the signal by ten and produces an output on line 97. Thus ten times the binary decode of the digit entered is added to the binary decode of the digit entered in the adder 116 and th sum is produced on line 99 to AND gate 118. However this signal is blocked from entering the scan range register 122 because the DIGIT2 signal on line 103 is at logical zero when the DIGITC signal on line 63 is at logic one initially.

If a second digit character is entered from the keyboard, it is passed through AND gate 106 and decoded by binary decode 108. The DIGIT2 signal on line 103 was raised by the previous decode 134 of the output of the counter 132. This second digit decode is then added to ten times the first digit by adder 116 to produce a sum replacing the previous sum on line 99 which is gated by the DIGIT2 signal on line 103 and the DIGITC signal on line 63 through AND gate 118 and OR gate 120 to produce the scan range in register 122. This signal is again decoded as previously described by decode 126. The character is also printed by the print control logic 7 as previously described.

The system, in the preferred embodiment, will not accept a range number which has more than two digits. If a third digit character is entered then the digit greater than two signal on line 125 of decode 134 will be raised to logical one. This character will also be printed as previously described but when a carrier return is entered indicating the termination of the line, a signal will be raised on line 19 by decode 56 in FIG. 7 and AND gate 144 will set a signal on line 133 through OR gate 140 to cause the range prompt latch 142 to control the printer through register 18 to reprompt the operator to enter a new range count. Also if a non-digit character is entered during the range input mode then the DIGITC signal on line 63 will be at logical zero and, since no line terminating signal LINETERM has been entered, the signal on line 19 from decode 56 will also be at logical zero, the signal $\overline{\text{LINETERM}}$ on line 29 will be at logical one, and the latch 138 will be set through AND gate 136 to provide a logical one NONDIGITC signal on line 127. Then when a line-terminating character (carrier return for example) is keyed the LINETERM signal on line 19 will become logical one and NONDIGITC signal 127 through OR gate 146 will set the reprompt signal 133 through AND gate 144 and cause the printer to reprompt the operator for a new range input.

Figure 11:
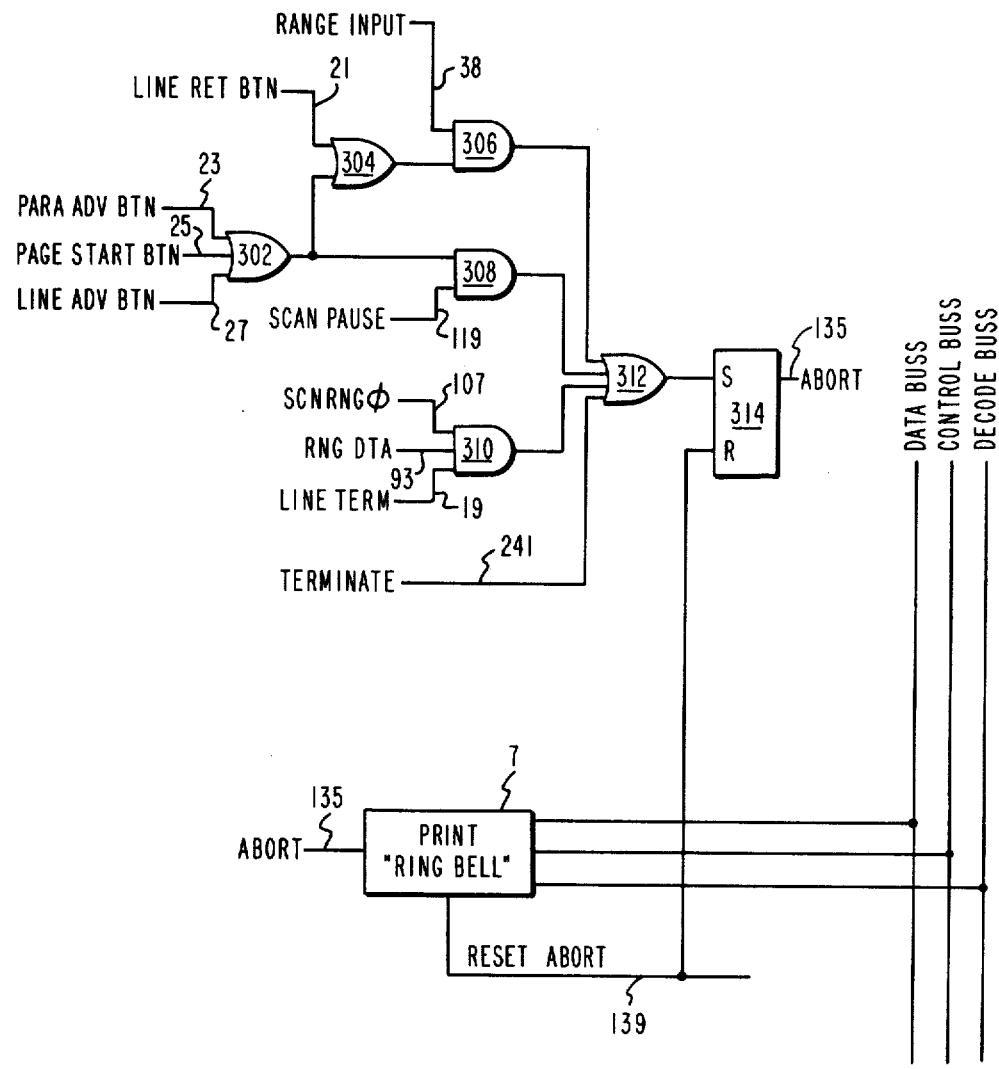
FIG. 11 shows the logic used to terminate a non-playout adjust operation when improper conditions are set in the system.

Referring now to FIG. 11 and assuming that the range input latch 98 of FIG. 6 is set in the range input mode as previously described the RANGE INPUT signal on line 38 provides one input to AND gate 306. If the operator depresses a line return key button on the keyboard 3 (FIG. 1) this signal will be decoded by character decode 56 to produce a logical one signal on line 21 in FIG. 7. The LINE RETURN BUTTON signal on line 21 is transmitted into OR gate 304 of FIG. 11 and is gated through AND gate 306 by RANGE INPUT signal on line 38 and through OR gate 312 to set the ABORT latch 314. The same operation is activated through OR gate 302 if the operator depresses the paragraph advance, page start, or line advance key buttons. This produces a logical one signal on line 135 which is transmitted to the print control logic 7 to ring the warning bell in the printer. The ABORT signal is also gated through OR gate 78 in FIG. 6 to reset the RANGE INPUT latch 98 on line 42 and take the system out of the range input mode.

ACTIVE SCAN

Assuming that the operator has correctly entered a one-digit or two-digit non-zero scan range number into the system and keyed in a carrier return, the scan range is now set in register 122 in FIG. 4 and the scan range equal zero (SCNRANGO) signal on line 107 is a logical zero while scan range not equal zero ($\overline{\text{SCNRNGO}}$) signal on line 109 is a logical one.

Referring now to FIG. 6, the combination of $\overline{\text{SCNRNGO}}$ on line 109 and the keyed line terminating carrier return on line 19 is gated by the RANGE INPUT signal on line 38 from RANGE INPUT latch 98 through AND gate 26 and OR gate 68 to produce a SET ACTIVE SCAN signal on line 59. The SET ACTIVE SCAN signal on line 59 provides an input to the scan latch 102 to produce an ACTIVE SCAN signal on line 57. The SET ACTIVE SCAN signal on line 59 is also gated through OR gate 78 to reset the range input latch 98 on line 42. The SET ACTIVE SCAN signal on line 59 also serves to set the auto latch 284 in FIG. 10 to provide an auto signal AUTOL on line 283. The system is now in the active scan mode.

Figure 8:
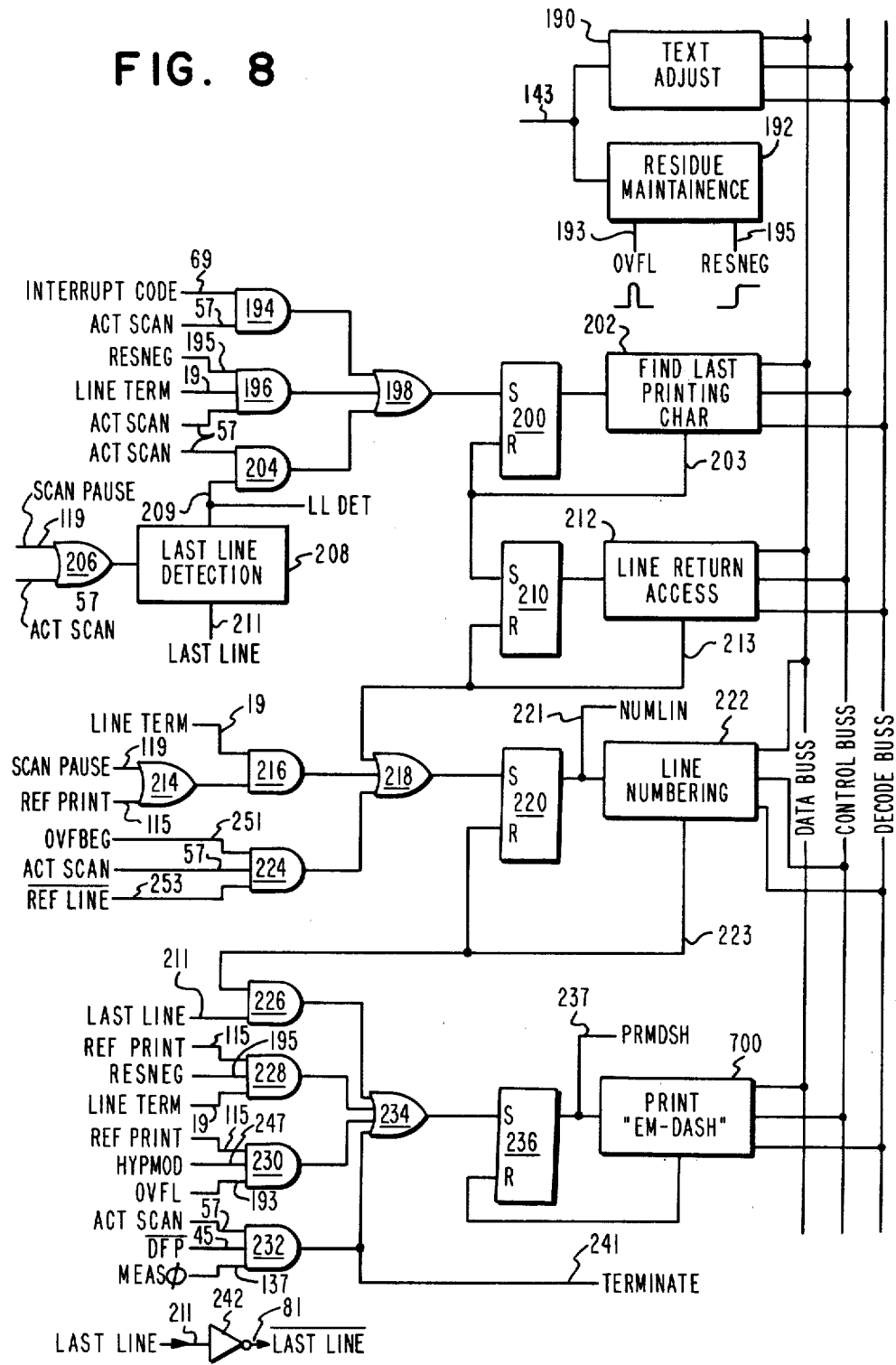

Referring to FIGS. 7 and 8, non-playout adjust will be terminated immediately if no format measure has been set previously and the first codes read from the memory are not document formatting parameters. The decode 162 output 137 of the measure register 160 will be at logical zero and the ACTIVE SCAN signal on line 57 is at logical one. If the character decoded by decode 56 in FIG. 4 is not a document formatting parameter (DFP) then $\overline{\text{DFP}}$ on line 45 becomes logical one. This activates gate 232 to produce a TERMI-NATE signal on line 241. The TERMINATE signal sets the ABORT latch 314 in FIG. 11 to abort the non-playout adjust operation as previously described. If the characters initially scanned in the memory are formatting parameters then $\overline{\text{DFP}}$ will be at logical zero, MODEC will be at logical one indicating the decode of a mode code, and the measure will be set by the data stored in the memory. The measure information codes follow the mode code in the memory 4. The MODEC signal on line 141 sets shift register 316 to activate AND gate 318 to transfer the measure information from the data bus 13 into binary decode 240. The output of the binary decode 240 then passes into measure register 160 where it is stored.

Referring now to FIG. 7 the AUTOL signal on line 283 is input to OR gate 178 to produce the signal secondary mode play (SMPLA) on line 179 into AND gate 182. This signal is gated through AND gate 182 by the signal secondary mode interrupt not ($\overline{\text{SMINTR}}$) on line 187 which is derived from NOR gate 186. At this time all signals to the input of NOR gate 186 are at logical zero as will be explained below. The output of AND gate 182 enables the logic to read sequentially the characters stored in the memory 4, to accumulate escapement for the printing line based on the characters read and to adjust the text. The reading of the characters takes place through the shift register control and decode logic shown in FIG. 2 as previously described. The ACTIVE SCAN signal on line 57 also passes through INVERTER 172 where it is inverted and input to AND gate 174 to inhibit the print enable block 14, thereby preventing any printing of characters while in the active scan mode.

Referring now to FIG. 8 the text adjust control 190 is operating because the signals SMPLA on line 179 and $\overline{\text{SMINTR}}$ on line 187 into AND gate 182 are both at logical one and produce an enabling signal on line 143. The text adjust control will include a counter for accumulating the escapements for the characters being read from the memory. The residue maintenance control 192 is also active at this time because of the output of AND gate 182. The residue maintenance control includes a comparator for comparing the escapements accumulated in the text adjust control 190 with the total escapements set for the printing line and producing an output signal pulse on line 193 when an overflow occurs and an output on line 195 when the residue, that is the escapement remaining on the printing line, becomes a negative number. The details of the text adjust control 190 and the residue maintenance control 192 are not presented in detail herein because these controls are well known in the prior art. For example, U.S. Pat. No. 3,991,405, issued Nov. 9, 1976 to William Weller Boyd, et al describes these controls in FIG. 2A and at column 8 thereof.

LINE OVERFLOW (HYPHENATION)

Figure 9:
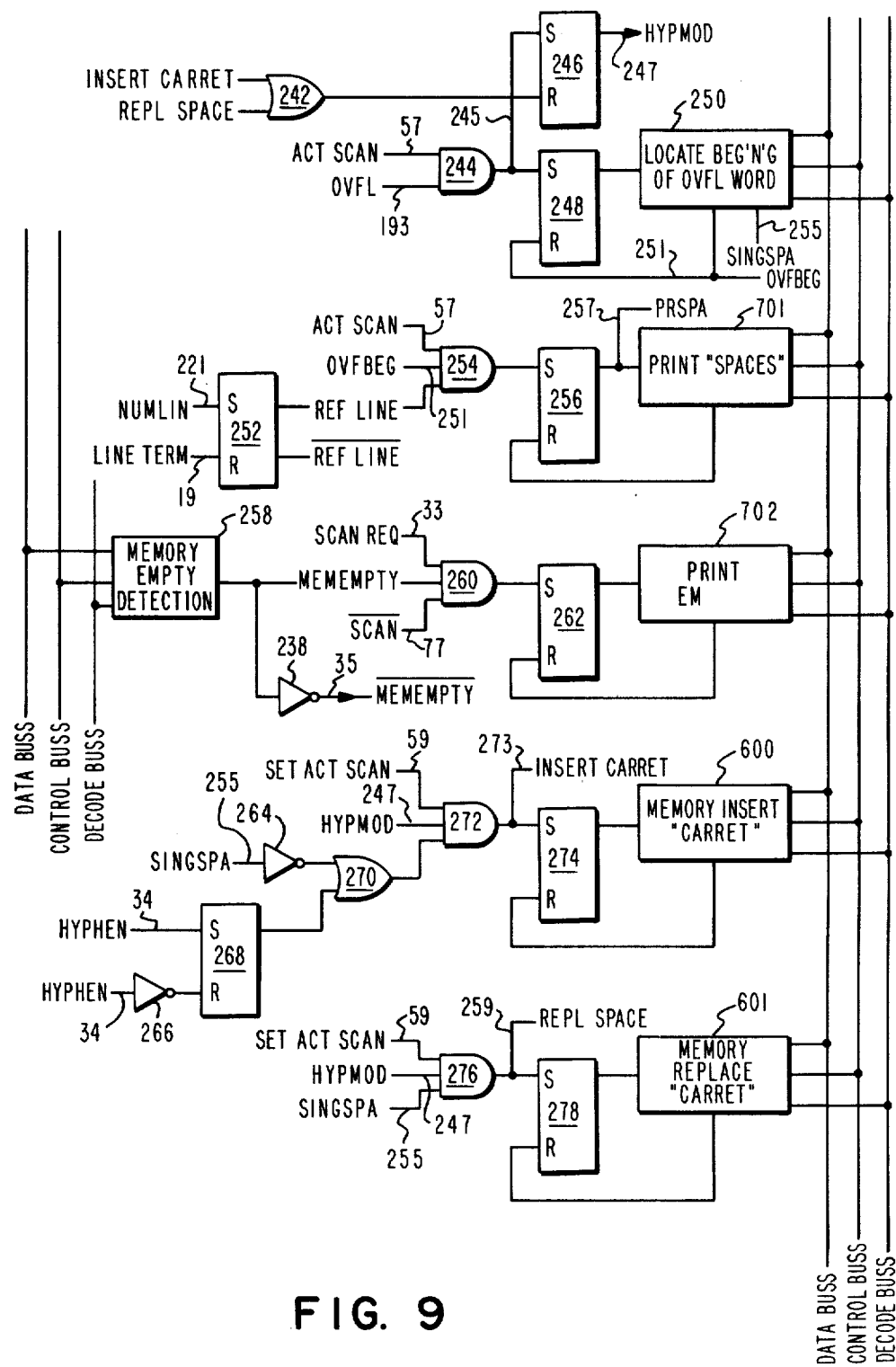

Assume that during the text adjust operation a word is encountered which spans the "hot zone". "Hot zone" is a term developed in the prior art which defines a variable residue immediately preceding a desired maximum right margin, whereby, if the last word in the line terminates within the hot zone, the interword spaces within the line may be expanded within an acceptable quality limit to produce a justified text line. This term is well developed in U.S. Pat. No. 3,998,311 issued Dec. 21, 1976 to John Charlie Greek, et al. If a word is encountered which spans the hot zone, then the overflow signal, OVFL, on line 193 will be produced by the residue maintenance control 192. Referring to FIG. 9, the ACTIVE SCAN signal on line 57 gates the OVFL signal on line 193 through AND gate 244 to set the overflow latch 248 and the HYPMOD latch 246. The setting of the overflow latch 248 produces a signal to the control 250 which causes the system to locate the beginning of the overflow word in memory. In the preferred embodiment, this is accomplished by moving the operating point in the recirculating shift register memory back to the beginning of the overflow word by removing the operating flag from recirculating in the memory and reinserting it at the beginning of the overflow word as previously described in reference to FIG. 2. This type of process is also well known in the prior art and an example may be found in the above reference Boyd, et al patent column 14, lines 14–20.

When the operating point has been moved back to the beginning of the overflow word, the signal overflow beginning (OVFBEG) is produced on line 251. This signal resets the overflow latch 248. Assume now that the system has not previously had an interrupt occur on this printing line of the non-playout adjust process. Referring to FIG. 8, the combination of the ACTIVE SCAN signal on line 57 and the $\overline{\text{REFLINE}}$ signal on line 53 gate the OVFBEG signal on line 251 through AND gate 224 and OR gate 218 to set the line numbering latch 220. The $\overline{\text{REFLINE}}$ signal on line 253 is at logical one because the line number for this printing line has not been printed previously. This signal comes from reference line latch 252 in FIG. 9. Setting the line numbering latch 220 produces a signal NUMLIN on line 221 and also invokes the line numbering control 222. The line numbering control forces the printer 2 to print the number of the line in which the interrupt occurred. The line numbering control 222 includes a counter for accumulating the number of lines of text that have been adjusted in the non-playout adjust mode. This type of line numbering process is known in the prior art and is described in the above referenced Boyd, et al Patent at column 12, lines 20–65.

REFERENCE PRINT

Referring now to FIG. 6 the signal NUMLIN on line 221 is at logical one and passes through OR gate 70 where it is gated through AND gate 72 by ACTIVE SCAN signal 57 to produce a SET REFERENCE PRINT signal on line 46. The SET REFERENCE PRINT signal passes through OR gate 36 to produce a RESET ACTIVE SCAN signal on line 53 which in turn resets the active scan latch 102 and produces an $\overline{\text{ACTSCAN}}$ signal of logical one on line 77. The SET REFERENCE PRINT signal on line 46 also sets the reference print latch 100 to produce a REF PRINT signal on line 115 of logical one.

On completion of the printing of the line number, line numbering control 222 resets the line numbering latch 220 through line 223 which drops the NUMLIN signal 221 to logical zero. The SECONDARY MODE INTERRUPT signal on line 187 goes away, that is $\overline{\text{SMINTR}}$ becomes logical one, and since the ACTIVE SCAN latch has been reset producing a logical one from the output of INVERTER 172, a signal is produced from AND gate 174 to set the PRINT ENABLE control 14. The action that now occurs is the reading of the overflow word from the memory through the memory control and decode shown in FIG. 2 and printing out the characters of the overflow word. At the point of overflow, the signal OVFL on line 193 in FIG. 8 once again produces a logical 1 pulse. The OVFL signal is gated through AND gate 230 by the combination of REF PRINT on line 115 and HYPMOD on line 247 which were previously set. The output of AND gate 230 passes through OR gae 235 to set the PRINT "em dash" control 236. Setting the print "em dash" latch 236 produces a signal on line 237 to print "em dash" control 700 to control the printer logic 7 to print an "em dash" to indicate the point in the word at which the line overflow occurs. At the same time that the "em dash" is being printed, the PRMDSH signal on line 237 drives the output of NOR gate 186, $\overline{\text{SMINTR}}$ on line 187 to logical zero. This inhibits the reading of characters from the memory at control 184 by dropping the input to AND gate 182 and also inhibits printing of those characters by the PRINT ENABLE control 14 by blocking AND gate 174. When the printing of the "em dash" is completed, latch 236 is reset and the PRMDSH signal 237 goes to logical zero causing the $\overline{\text{SMINTR}}$ signal on line 187 to return to logical one and set AND gate 182 to continue the reading of characters from memory at 184 and sets AND gate 174 to enable printing of the characters read at 14. This allows the remainder of the overflow word to be played out.

Figure 10:
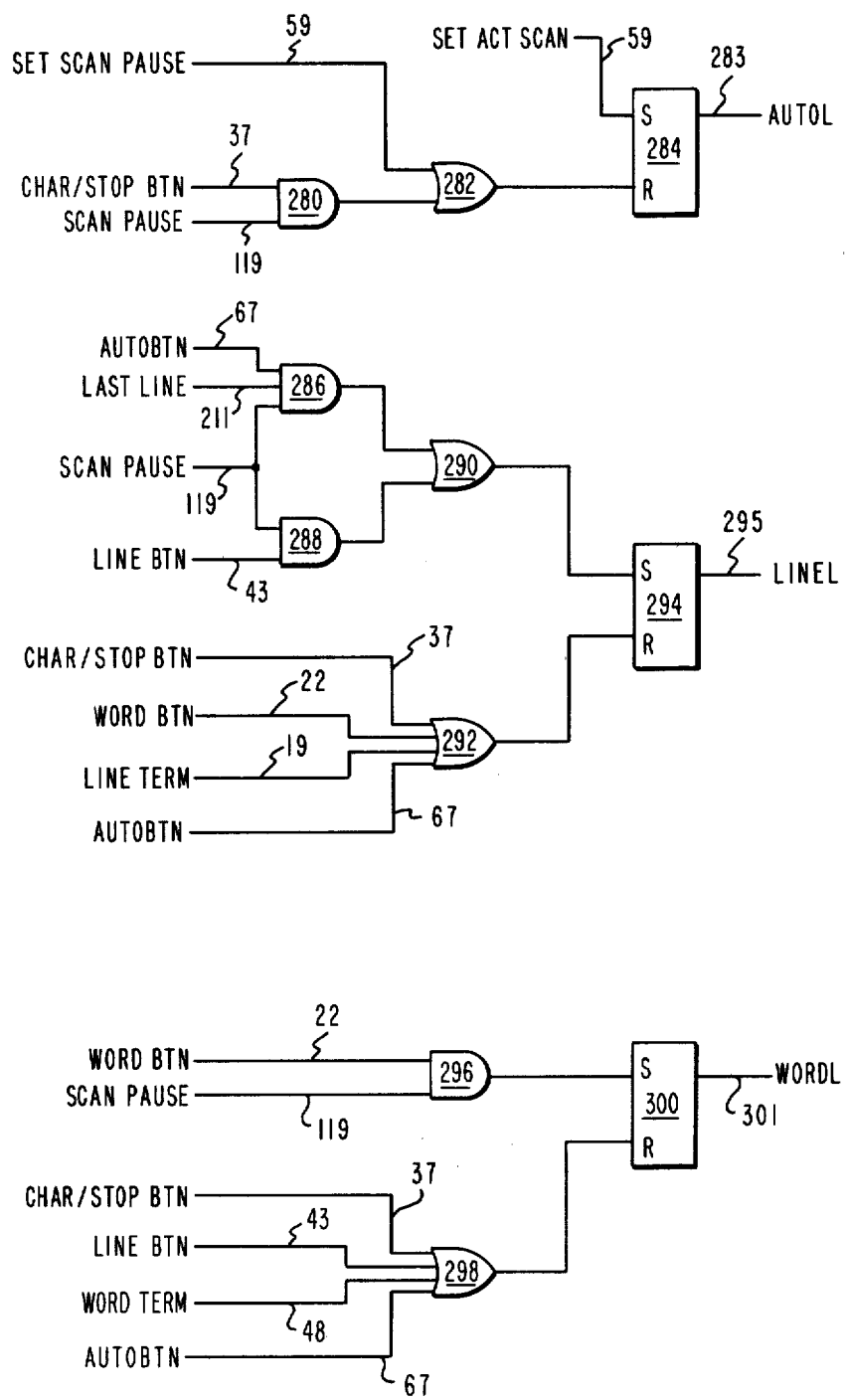
FIG. 10 shows the logic used to control the operation of the system during the active scan and reference print operations of FIG. 3.

When the end of the overflow word is reached, character decode 56 decodes a word terminating signal WORDTERM to produce a logical one signal on line 48. Also playout of the balance of the overflow word produces a negative residue signal RESNEG on line 195 from the residue maintenance control 192 in FIG. 8. Referring back to FIG. 6 at AND gate 88, the coincidence of the negative residue signal RESNEG on line 195 and HYPMOD on line 247 gates the word terminating signal WORDTERM on line 48 through OR 90. This signal, in conjunction with the REF PRINT signal on line 115 from the REFERENCE PRINT latch 100 activates gate 92 to produce a SET SCAN PAUSE signal on line 32 which sets the SCAN PAUSE latch 104. The SET SCAN PAUSE signal on line 32 is also gated through OR gate 82 to produce a signal on line 49 to reset the REFERENCE PRINT latch 100. In FIG. 10, the SET SCAN PAUSE SIGNAL on line 32 also passes through OR gate 282 to reset the AUTOL latch 284 and drop the AUTOL signal on line 283 to logical zero. This produces the scan pause mode.

SCAN PAUSE MODE

Referring now to FIGS. 6 and 7, in the scan pause mode the signal on line 119 produces an output from OR gate 158 to set the KEYBOARD ENABLE control 16 to allow the operator to use the keyboard. The PRINT ENABLE control 14 is still active because the ACTIVE SCAN signal on line 57 is logical zero. At this point, the operator will normally play out the overflow word by character using the character/stop button on the keyboard. Depression of the character/stop button on the keyboard 3 is decoded by character decode 56 to produce a logical one signal on line 37 and a logical zero signal on line 65. The codes generated by the depression of the character/stop button will not be inserted into the memory 4 because the $\overline{\text{BUTTON}}$ signal on line 65 goes to logical zero with each depression of the character/stop button thereby disabling the memory insert control 168. The $\overline{\text{BUTTON}}$ signal is a decode of whether a key depressed is a control key as opposed to a character key and is logical zero only when a control key is depressed. However, depression of the character/stop button causes a character to be read from the memory through the shift register control and decode 6 as previously described with reference to FIG. 2. This character follows the code of the character/stop button onto the data bus and is printed by the printer 2 in response to the print enable control 14 which was set after the $\overline{\text{BUTTON}}$ signal 65 became logical one. To further explain this situation, when the operator depresses a key button on the printer, the button is encoded and goes on the data bus. At that point, the print process is disabled because $\overline{\text{BUTTON}}$ is at logical zero since the character that's on the data bus is the keyboard button code. However, depression of the character/stop button coincident with scan pause causes a character to be read from the memory immediately following the depression of the button. When the read character comes onto the data bus the $\overline{\text{BUTTON}}$ signal now decodes as being logical one since it is the character that was read that is now being decoded. Therefore, the print enable control 14 is set to cause the printer 2 to print the character as it occurs on the data bus.

The operator continues sequentially depressing the character/stop button and causing the characters of the word to be printed until an appropriate hyphenation point is reached. At this point, the operator will key in a hyphen from the keyboard. The hyphen will be inserted into the memory by the MEMORY INSERT ENABLE contaol 168 in response to a signal from AND gate 164 which is produced by the combination of SCAN PAUSE on line 119, $\overline{\text{SMPLA}}$ on line 181, and $\overline{\text{BUTTON}}$ on line 65. The signal $\overline{\text{SMPLA}}$ is at logical one because the output of OR gate 178 is at logical zero and the signal $\overline{\text{BUTTON}}$ on line 65 is at logical one since the key button that was depressed was not a control key button. The hyphen will also be printed since the PRINT ENABLE control 14 is still active. When the hyphen is keyed, it is decoded by character decode 56 to produce a signal on line 34 in FIG. 7. This signal sets the latch 268 in FIG. 9 and, when the system is returned to active scan as described below, coincident with the SET ACTIVE SCAN signal on line 59 and HYPMOD on line 247, a carrier return is inserted in memory following the hyphen by latch 274. The INSERT CARRET signal on line 273 also resets the HYPMOD latch 246 through OR gate 242.

Once a decision has been made as to the proper hyphenation point of the overflow word and the hyphen has been keyed, the system can be placed back into the non-playout adjust mode by a depression of the auto key button on the keyboard 3. Referring now to FIG. 6, the coincidence of being in scan pause on line 79, not being on the last line of the non-playout adjust operation on line 81, and a decode of the auto botton on line 67 sets the SET ACTIVE SCAN signal on line 59 through AND gate 64 and OR gate 68. The SET ACTIVE SCAN signal resets the SCAN PAUSE latch 104 on line 121 through OR gate 94 and, in FIG. 10 sets the AUTOL latch 284 to produce the AUTOL signal on line 283. The SET ACTIVE SCAN signal on ling 59 also sets the ACTIVE SCAN latch 102 to produce a logical one ACTIVE SCAN signal on line 57. At this point, the system once again has a logical one secondary mode play, SMPLA, signal in FIG. 7 provided by the AUTOL signal 283 through OR gate 178 and the $\overline{\text{SMINTR}}$ signal on line 187 is at logical one since all the inputs to NOR gate 186 are at logical zero. Therefore the system proceeds adjusting text at text adjust control 190 in FIG. 8 and again maintaining the residue and detecting overflow conditions at RESIDUE MAINTENANCE control 192.

The operator also has the option not to hyphenate the overflow word, but rather to move the entire word down to the next printing line. If the decision is made to move the word down to the next printing line, then the auto button need only be depressed. Referring to FIG. 9, the SET ACTIVE SCAN signal on line 59 is derived in response to the depression of the auto button as described above. If there is a single space between the overflow word and the preceding word then the SINGSPA signal on line 255 from block 250 will be at logical one. This signal, coincident with HYPMOD on line 247 and SET ACTIVE SCAN on line 59 into AND gate 276 sets latch 278 to control 6 to replace the space with a carrier return in memory. The REPL SPACE signal on line 259 also resets the HYPMOD latch 246 through OR gate 242.

If the overflow word is preceded by more than a single space then INVERTER 264 will provide a signal through OR gate 270 to AND gate 272. This signal, in conjunction with SET ACT SCAN on line 59 and HYPMOD on 247 sets the latch 274 to insert a carrier return into the memory preceding the overflow word. The INSERT CARRET signal on line 273 also resets the HYPMOD latch 246 through OR gate 242. The system then returns to active scan as previously described.

REFERENCE PRINT

In subsequent text adjustment, it will next be assumed that the system encounters an interrupt code which is decoded by character decode 56 to produce a logical one signal at line 69 in FIG. 7. This interrupt code may be a stop code, error code, edit code, mode/measure code, tab/index code, or any other predetermined code. In FIG. 8, when an INTERRUPT CODE signal on line 69 is encountered concurrent with the ACTIVE SCAN signal on line 57 by AND gate 194, latch 200 is set through OR gate 198 to invoke the find last printing character control 202. The find last printing character control 202 causes the shift register control and decode described above with reference to FIG. 2 to move the operating point backward one character per memory revolution until a printing character is decoded on line 39 by character decode 56. When a printing character is found to be in the shift register control and decode 6, a signal from the find last printing character control 202 on line 203 resets the latch 200 and sets latch 210 to produce a signal to the line return access control 212. The line return access control 212 causes the operating point to be moved backward in the shift register memory 4 until a line termination character is detected by the character decode 56 and a signal placed on line 19. The line termination character will be either a carrier return, required carrier return, or zero-index carrier return. When one of these characters is detected the line return access control 212 generates a signal on line 213 to reset latch 210 and sets the line numbering latch 220 through OR gate 218. This brings the NUMLIN signal on line 221 to logical one and invokes the line numbering control 222 as previously described. The NUMLIN signal on line 221, now referring to FIG. 7, drops the $\overline{\text{SMINTR}}$ signal on line 187 to logical zero through NOR gae 186. This in turn inhibits the reading of characters from memory at AND gate 182 for the duration of the NUMLIN signal being at logical one and also inhibits printing of characters at AND Gate 174. The NUMLIN signal on line 221 sets the reference print latch 100 on line 46 through AND gate 72 and OR gate 70 in FIG. 6. The SET REFERENCE PRINT signal on line 46 also resets the ACTIVE SCAN latch 102 on line 53 through OR gate 36. When the line numbering control 222 completes the printing of the line number by the printer 2, a signal is generated on line 223 to reset the latch 220 and drop the signal NUMLIN on line 221 to logical zero.

Since the system has been taken out of active scan the signal on line 57 in FIG. 7 is at logical zero is inverted by INVERTER 172 to trigger the PRINT ENABLE control 14 through AND gate 174. The $\overline{\text{SMINTR}}$ signal 187 is also at logical one since NUMLIN has returned to logical zero. The READ SEQUENTIAL CHARACTERS control 184 is enabled by the AUTOL signal on line 283 through OR gate 178 and $\overline{\text{SMINTR}}$ on line 187 through AND gate 182 since the line numbering process has been completed. Text characters will play out of memory and be printed by the printer 2 under the control of PRINT ENABLE control 14 until the interrupt code is again reached in the memory. Referring now to FIG. 6, the INTERRUPT CODE on line 69 into OR gate 90 is gated by REFERENCE PRINT on line 115 through AND gate 92 to set the SET SCAN PAUSE signal on line 32. SET SCAN PAUSE on line 32 sets latch 104 and resets the REFERENCE PRINT latch 100 through OR gate 82. The SET SCAN PAUSE signal on line 32 also resets the AUTOL latch as shown in FIG. 10 through OR gate 282. Then, in FIG. 7, with SCAN PAUSE activated, the keyboard is enabled through OR gate 158 and the MEMORY INSERT control is enabled through AND gate 164. The PRINT ENABLE control 14 is still enabled because the system is not in active scan. However the READ SEQUENTIAL CHARACTERS control 184 has been disabled because the AUTOL latch has been reset and the LINE and WORD latches have not yet been set. Therefore, the SMPLA signal is at logical zero and the READ SEQUENTIAL CHARACTERS control 184 is disabled.

In the scan pause mode, the full power of the word processing facilities are at the disposal of the operator to handle the interrupt. Accessing modes are available in the form of line returns, memory insert capabilities are available, keyboard facilities for keying information into the memory and printing it out on paper are available, and codes may be deleted from the memory or characters played out from the memory while in the scan pause mode. However, the operator is not allowed to advance the operating point in memory other than by word since paragraph advance or line advance would destroy the accuracy of the line count. Therefore, in FIG. 11, a decode of the PARAGRAPH ADVANCE button on line 23, the PAGE START button on line 25 or the LINE ADVANCE button on line 27 while in the scan pause mode will result in the ABORT latch 314 being set through OR gate 302 and AND gate 308 to terminate the non-playout adjust operation. After the interrupt has been handled in whatever manner chosen by the operator, the system can be reentered into the non-playout adjust mode by depressing the AUTO button on the keyboard.

We will now assume that the system has reentered the non-playout adjust mode and encounters a line overflow condition on the same line as the previous interrupt. Referring now to FIG. 9, in the previous interrupt on this line, the NUMLIN signal on line 221 has set the latch 252 to produce the signal called REFLINE. Since no line termination code has been processed at this point the REFLINE signal is still true when the overflow occurs. After ths system has backed up the operating flag to the beginning of the overflow word in memory and the signal OVFBEG on line 251 has become a logical one as previously described in the other hyphenation case, the ACTSCAN signal on line 57 and REFLINE signal into AND gate 254 gate the OVFBEG signal on line 251 through to set the latch 256 and produce the PRSPA signal on line 257. The PRSPA signal on line 257 sets the print spaces control 701 to cause the printer 2 to advance the carrier by a number of spaces. The PRSPA signal on line 257 also drops the SMINTR signal on line 187 in FIG. 7 to a logical zero and disables the READ SEQUENTIAL CHARACTERS control 184 and the PRINT ENABLE control 14. In FIG. 6, the PRSPA signal on line 257 into OR gate 70 is gated by the ACTIVE SCAN signal on line 57 through AND gate 72 to provide the SET REFERENCE PRINT signal on line 46. This signal resets the ACTIVE SCAN latch 102 through OR gate 36 and sets the REFERENCE PRINT latch 100 on line 46. After the carrier has been advanced by the requisite number of spaces, a signal is returned to the PRINT SPACES control 701 which resets latch 256 and drops the PRSPA signal on line 257 to logical zero.

At this point, the playout of the overflow word proceeds and is accomplished in the same manner as described in the previous hyphenation case with the "em dash" being inserted at the point of overflow. After the operator has handled the hyphenation decision as previously described, the system may be again placed into active scan by depressing the auto keybutton as previously described.

If the system is operating in a mode where a forced overflow of the printing line will occur, a reference print will be provided to the operator to indicate the forced overflow. This condition occurs for special sequences such as centering sequences where the text will be forced on one printing line. Referring to FIG. 8, the combination of negative residue signal RESNEG on line 195 and ACT SCAN on line 57 activate AND gate 196 to gate a line terminating signal LINETERM on line 19 to set latch 200 and print out the text line on which the forced overflow occurs as previously described for hyphenation overflow.

LAST LINE

Now referring to FIG. 8, assume that the system has been interrupted for an interrupt code on the last line in the scan range and that reference print is being started for this interrupt. After printing the line number as previously described for an interrupt code, the signal last line on line 211 from the LAST LINE detector 208 will be at a logical one. With the reset of the LINE NUMBERING control latch 220 and the coincidence of the LAST LINE signal on line 211 being true, latch 236 is set through AND gate 226 and OR gate 234 to invoke print control 700 to print an "em dash" immediately after the line number. Then the reference print mode proceeds as previously described for an interrupt code to the scan pause mode. After handling the interrupt code, when the operator attempts to reenter active scan, the system is inhibited from setting the ACTIVE SCAN latch in FIG. 6 because the $\overline{\text{LASTLINE}}$ signal on line 31 into AND gate 64 is at logical zero. However, referring to FIG. 10, the coincidence of the LAST LINE signal on line 211 and the AUTO button signal on line 67 is gated through AND gate 286 by SCAN PULSE signal on line 119 and through OR gate 290 to set the LINEL latch 294 and produce a logical one LINEL signal on line 295. In FIG. 7, the LINEL signal into OR gate 178 raises the SMPLA signal on line 179 and enables the read sequential character control 184 through AND gate 182 since the $\overline{\text{SMINTR}}$ signal is at logical one on line 187. Since the system is not in active scan, the signal on line 57 is at logical zero and AND gate 174 drives the PRINT ENABLE control 14 to play out the remainder of the last line until a line termination code is detected. Referring back to FIG. 10, when the LINE-TERMINATION code is detected the line latch 294 is reset and the signal LINEL drops to logical zero.

Next, the case will be covered where the scan range is reached without having an interrupt code on the last line. Referring to FIG. 8, the system will be in the active scan mode when the last line detector 208 detects the last line and the LIDET signal on line 209 becomes a logical one. This signal is gated through AND gate 204 by the ACTIVE SCAN signal on line 57 and through OR gate 198 to set the latch 200 and invoke the FIND LAST PRINTING CHARACTER control 202. The FIND LAST PRINTING CHARACTER control will move the operating point in the memory backward until a printing character is reached and then a line return will be executed as previously described by the line return control 212. After the line return has been executed, the reset signal on line 213 will reset the latch 210 and set latch 220 through OR gate 218 to invoke the LINE NUMBERING control 222 to print the line number for the last line in the scan range. Following printing of the line number a signal on line 223 is generated to reset the latch 220 and this signal is gated through AND gate 226 by the LAST LINE signal on line 211 and through OR gate 234 to set the latch 236 and invoke the print "em dash" control 700 to print an "em dash" following the line number for the last line. The PRMDSH signal on line 237 drops the $\overline{\text{SMINTR}}$ signal on line 187 in FIG. 7 to logical zero and inhibits the READ SEQUENTIAL CHARACTERS control 184 and PRINT ENABLE control 14 from operating at this time. After the print "em dash" control 700 resets the latch 236 and drops the PRMDSH signal to logical zero the reoccurrence of the $\overline{\text{SMINTR}}$ signal on line 187 enables the read sequential character control 184 and print enable control 14 to print out the characters for the last line. The characters for the last line will continue to play out until the LLDET signal reoccurs coincident with the REFERENCE PRINT signal on line 115 in FIG. 6 to reset the REFERENCE PRINT latch through AND gate 24 and OR gate 82 on line 49. The resetting of the REFERENCE PRINT latch 100 takes the system out of the scan mode because no other latches are set at this time.

At this point, a single block of text defined by the line count entered by the operator in the range input mode has been processed to a set of formatting parameters in effect for that text block. The operator now has the option to enter a new set of formatting parameters if desired and request the scan mode again at which time a new range input number may be entered to process the text block defined by the new line count. In this manner, a page of text may be formatted into as many blocks comprising different numbers of lines as desired for a particular composing job.

While the invention has been particularly shown and described with reference to a preferred embodiment thereof, it would be understood by those skilled in the art that various changes in form and detail may be made therein without departing from the spirit and scope of the invention such as substituting a CRT display for the printer, etc.

What is claimed is:

1. A system for non-output formatting of text sequences into text blocks, each of said text blocks having a different escapement length than the preceding text block and including at least one text line, comprising:
a recirculating memory;
a flag code stored in said recirculating memory for defining the addressable point in said recirculating memory immediately following said flag code;
input means connected to said recirculating memory for inputting text sequences and format control codes into said recirculating memory,
first operator selectable means in said input means for generating a non-output text adjust scan mode signal;
second operator selectable means in said input means for entering a range number;
display means connected to said input means and said recirculating memory; and
control means connected to said recirculating memory, said input means and said display means, and responsive to said non-output text adjust scan mode signal for activating a non-output text adjust mode including means for controlling said display means to display a prompt to the operator to enter a range number representing the number of text lines to be arranged into a text block, means for storing the range number entered, means for detecting the location of said flag code in said recirculating memory, means responsive to the detection of said flag code for decoding format control codes following said flag code in said recirculating memory and storing in a first register a line escapement length defined by said format control codes, and memory scan means, including means for decoding text sequences in said recirculating memory following said flag code and accumulating in a second register escapement values for the text sequences, compare means connected to said first and second registers for comparing the contents thereof, means for generating line ending codes operable to insert a line ending code into said recirculating memory in response to an equal compare from said compare means, means responsive to said means for generating line ending codes for accumulating a count of the number of line ending codes inserted into said recirculating memory, and means for comparing the count of line ending codes to the stored range number operative to deactivate said non-output text adjust mode when the compare is equal.

2. The system of claim 1 wherein said control means further includes means for detecting a memory empty condition, means responsive to the memory empty condition for displaying to the operator a visual indication that the memory is empty, and means for aborting the non-output text adjust mode in response to the detection of a memory empty condition.

3. The system of claim 1 wherein said control means further includes means responsive to said input means and said means for storing the range number entered for aborting the non-output text adjust mode when no range number is input.

4. The system of claim 1 wherein said control means further includes means responsive to said means for decoding format control codes for aborting the non-output text adjust mode when no format control codes are present in said recirculating memory.

5. The system of claim 1 wherein said control means further includes decode means connected to said memory scan means for detecting a number of predefined special codes in said memory, interrupt means responsive to said decode means for suspending operation of said memory scan means upon detection of one of said predefined special codes and means responsive to said interrupt means for displaying the count of line ending codes and the contents of said memory preceding and following the location of the flag code to define for the operator the location in the text of the predefined special code.

6. The system of claim 5 wherein said control means further includes means for generating dash codes and means connected to said compare means responsive to a line overflow condition, defined by the second register value exceeding the first register value, for connecting said means for generating dash codes to said means for displaying, for displaying the count of line ending codes and the text sequence causing the line overflow condition with a dash inserted at the point of overflow.

7. The system of claim 6 wherein said control means further includes means connected to said scan means for detecting a code defining a forced line overflow condition in said non-output text adjust mode and means responsive to the detection of said code defining a forced line overflow condition for displaying the count of line ending codes and the text sequence causing the forced overflow condition.

8. The system of claim 5 wherein said control means further includes means selectable by the operator through said input means for relocating the flag code in said recirculating memory while the operation of the memory scan means is suspended and means selectable by the operator through said input means for inserting or deleting text sequences in said memory at the new location of the flag code.

9. The system of claim 8 wherein said control means further includes means for displaying additional text sequences from said recirculating memory selected by the operator at the new location of the flag code while operation of said memory scan means is suspended.

10. The system of claim 8 wherein said control means further includes means for aborting the non-output text adjust mode in response to relocating the flag code forward in said recirculating memory by more than one text sequence while the memory scan is suspended.

11. The system of claim 9 wherein said control means further includes means responsive to said interrupt means and an equal compare from said compare means for displaying a new count of line ending codes for the additional text selected by the operator when the escapement value of the additional text exceeds the defined line escapement length.

* * * * *